UNITED STATES PATENT OFFICE.

PAGE R. BOYLES, OF SEATTLE, WASHINGTON.

FOOD PRODUCT CONSISTING OF A JELLY BASE.

1,067,714.           Specification of Letters Patent.      Patented July 15, 1913.

No Drawing.      Application filed October 16, 1912.   Serial No. 726,132.

*To all whom it may concern:*

Be it known that I, PAGE R. BOYLES, a citizen of the United States, and resident of the city of Seattle, in the county of King and State of Washington, have invented certain new and useful Improvements in Food Products Consisting of a Jelly Base, of which the following is a specification.

My invention relates to food products and consists of a jelly base, or a product which may be used as a base for making jelly by combination thereof with water and sugar under proper manipulation, as by boiling, etc.

The object of my invention is to provide a product, to be composed of the most essential ingredients of jelly making and extracted from fruits, ingredients which under the ordinary conditions of domestic jelly making are of uncertain quality and proportions, these ingredients to be in the condition and combined in the exact proportions best adapted for making jelly upon the addition of water and sugar in designated quantities, thereby substituting definite and known conditions and materials for uncertain conditions and materials and thus making the results to be obtained certain and known, instead of uncertain and doubtful.

The great bulk and weight of materials required in making jelly consist of sugar and water and are obtainable anywhere in a uniform and standard quality and composition. The constituents of the fruit used which are absolutely essential in making jelly, are pectin and an acid, usually tartaric acid or a closely related acid. The fruit juices used in making jelly must contain these two ingredients, and may also contain each its characteristic flavoring ingredients which give the jelly its characteristic flavor. The flavoring ingredients are not, however, an essential in making jelly, although they are a desirable constituent. It is true of the process of jelly making, as of all processes partaking of a chemical character, that there is a certain proportional relationship between the various essential ingredients, which will produce the best results. Under the conditions present in domestic jelly making, little is known as to the proportions of the essential ingredients of the materials being worked upon, particularly of the pectin and acid, the ingredients which it is most essential should be present in the right proportions. The process is one of "rule-of-thumb", instead of exact measurement and proportion. The strength of the fruit juices used, as well as their proportional content of pectin and acid, is unknown. To remedy these uncertain conditions, I propose to furnish a product, to consist of pectin and an acid, combined together in the right proportions for jelly making, this being, preferably, in a dry, granular form and adapted, when combined with a definite and specified volume of sugar and water and heated, to produce jelly.

In ordinary domestic jelly making, the pectin is developed and made available, by cooking the fruit, and the acid is provided by the acid which is contained in the fruit. The amount of pectin and acid contained in the fruit varies with the kind of fruit and its condition. If these are not present in approximately the right proportions and are also combined with the right amount of sugar and water, then the jelly will not form or is of an inferior quality, or the quantity is not what should have been obtained. As a substitute for this uncertainty I combine pectin, obtained by extraction from fruits, and reduced to a dry, granular condition, with the exact amount of an acid required to properly combine with the pectin, thus making a jelly base to which a definite amount of sugar and water may be added, such that, when heated, it will form jelly of a uniform quality and composition, in which no ingredient is present in a wasteful excess. The acid which, in the present state of the art seems preferable for this use, is tartaric acid, the same being produced from fruits and being a large constituent of the fruit acids which act in making jelly from fruits. It is also of wholesome character and could hardly be considered as an objectionable ingredient or adulterant.

As a substitute, either in whole or in part, for the water, fruit juices may be used, which will give the jelly the flavor of the fruit. Or any artificially prepared flavor may be used.

The proportions of pectin and acid required for making jelly are two parts by weight of pectin to one of tartaric acid. Of this mixture, a portion consisting of one third ounce of pectin and one sixth ounce of tartaric acid, or a combined weight of one half ounce, is placed in a quart of water and allowed to stand for a short time, say an hour, until thoroughly dissolved. It is then boiled for a short time, say about ten minutes, when three quarters of a quart of sugar, or one and a half pounds is added and the boiling continued until the usual jelly tests may be observed. At the time of adding the sugar the desired flavoring material may be added. If this flavoring material consists of fruit juices, the character of these juices and the known qualities and composition thereof may be taken into consideration in determining whether the volume of these juices is to be allowed for as a substitute, in whole or in part, for the water called for. If the juices are such as are known to be rich in pectin and acid, then they may be considered purely as an addition to the volume of water stated, the water volume to not be reduced, although the sugar content should be increased. If, however, the juices are such as are known to be deficient in pectin and acid, or of either of these, then they should be considered only as a partial substitute for the water indicated, the extent of the substitution depending upon the deficiency of the juice in these essential ingredients.

By the use of this jelly base, anyone, anywhere, may be able, by following simple directions, to make an excellent jelly. The volume and weight of the jelly base is insignificant as compared with the volume and weight of the jelly product. It is also in a form in which it may be kept indefinitely and easily transported to points where it would be impossible to transport manufactured jelly. The process is also so simple that any one can carry it out. By the use of half an ounce of the jelly base approximately three and a half pounds of jelly may be made. It also reduces the process to one of scientific certainty, instead of one full of uncertainty, in which guess work and rule-of-thumb are the principal guides. Its use will save a great deal of worry and prevent waste of a large amount of material.

Other acids than tartaric acid may be used, but tartaric acid is preferred in the present state of the art. Its action upon the pectin to produce jelly is rather more favorable than other available acids, it is wholesome, cheap and easily obtainable in a uniformity of purity which makes it reliable.

An artificial flavor might be combined with the dry jelly base, but I prefer to omit this from the standard product.

What I claim and desire to patent is:

1. A jelly base consisting of pectin and an acid in dry granular form mixed in the proportions required to make jelly.

2. A jelly base consisting of pectin and a vegetable acid in dry form mixed together in the proportions required for making jelly.

3. A jelly base consisting of pectin and tartaric acid in dry form mixed together in the proportions required for making jelly.

4. A jelly base consisting of pectin and tartaric acid mixed together in the proportions of two parts by weight of pectin to one part of the tartaric acid.

5. A jelly base consisting of a mixture of pectin and tartaric acid in dry, granular form, in the proportions of two parts by weight of pectin and one part by weight of tartaric acid.

In testimony whereof I have hereunto affixed my signature at Seattle, Washington, this 11th day of October, 1912.

PAGE R. BOYLES.

Witnesses:
 HENRY L. REYNOLDS,
 WM. SPUREK, Jr.